Nov. 11, 1952 R. B. TROUSDALE 2,617,931
PULSE COMMUTATING RING COUNTER CIRCUIT
Original Filed Dec. 24, 1949
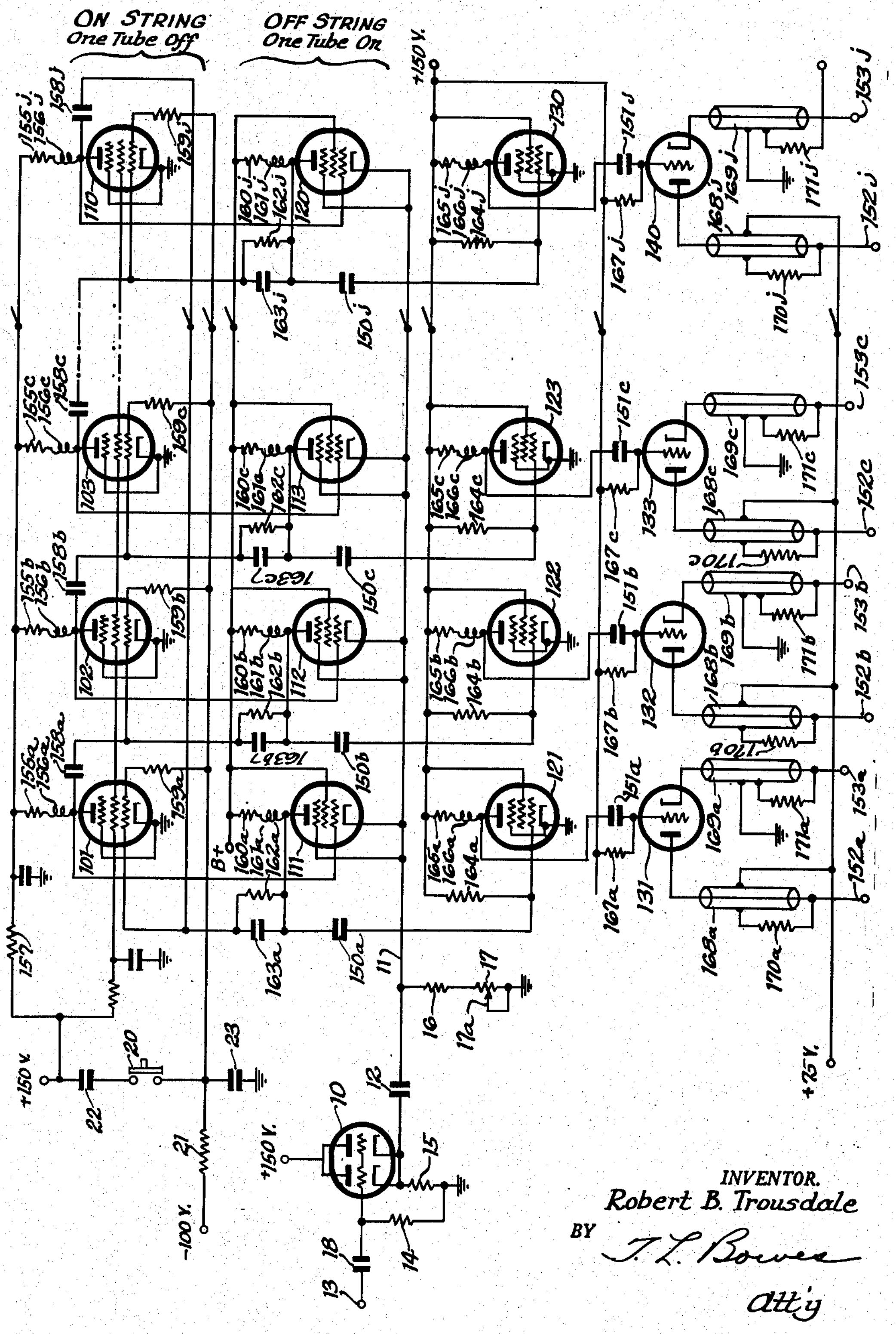
INVENTOR.
Robert B. Trousdale
BY T. L. Bowes
Att'y Patented Nov. 11, 1952 2,617,931

UNITED STATES PATENT OFFICE 2,617,931

PULSE COMMUTATING RING COUNTER CIRCUIT

Robert B. Trousdale, Rochester, N. Y., assignor to Stromberg-Carlson Company, a corporation of New York Original application December 24, 1949, Serial No. 134,974. Divided and this application April 17, 1950, Serial No. 156,399

16 Claims. (Cl. 250—27)

This invention relates to a ring counter circuit, and, more particularly, to a ring counter circuit for commutating pulses successively to a plurality of electrical circuits and includes an improved starting arrangement for initiating the count and for insuring commutation to only one of the plurality of circuits at a given instant. Specifically, the instant application is a divisional application of the co-pending joint application of Frank A. Morris and Robert B. Trousdale, Serial No. 134,974, filed on December 24, 1949, and assigned to the same assignee as the present application.

In many situations it is desirable to provide a counter circuit in which driving pulses occurring at a predetermined repetition rate are counted to obtain output pulses corresponding to every *n*th driving pulse. It is further necessary, in some instances, to divert, or commutate the output pulses developed by the counter circuit successively to a plurality of electrical circuits so as to energize the electrical circuits in a predetermined sequence at the counting rate of the counter circuit. A specific application of the present invention is in the art of telephony, particularly in connection with an electronic telephone system of the type disclosed in the above identified application, wherein a system of multiplexing, namely, pulsed sampling effectively at an ultrasonic rate of the control and intelligence signals produced at each substation of the system, is utilized to provide signal channel separation. To minimize the amount of equipment used in certain components of the system, a decimal system of multiplexing is employed which entails arbitrary division of the lines of the system into sub-groups. In order to assigne each line a particular pulse time position, it is necessary to count down from a series of driving pulses which occur at a relatively high repetition rate to obtain units and tens pulses which may be combined on a decimal basis to provide signal channel separation for the lines of the system. In such a system, it is necessary that the counter circuit commutate output pulses to various circuits during particular time intervals, otherwise the correct signal channel separation is not obtained. Furthermore, it is desirable to accomplish the switching action between channels in a minimum amount of time so as fully to utilize the time allotted each channel.

It is an object of the present invention to provide a new and improved ring counter circuit for commutating output pulses successively to a plurality of electrical circuits.

It is another object of the present invention to provide a ring counter circuit including an improved starting arrangement for insuring commutation of the counter circuit output pulses to only one output circuit at a time.

Still another object of the present invention is to provide a pulse commutating ring counter circuit in which positive and negative output pulses are commutated successively to a plurality of electrical circuits and wherein the starting of the counter circuit is so arranged as to prevent multiple commutation from the counter circuit to the plurality of the electrical circuits.

It is a further object of the present invention to provide a pulse commutating ring counter circuit in which output pulses are commutated successively to a plurality of output circuits and wherein the commutation period is of extremely short duration.

The invention, both as to its organization and method of operation, together with further objects and advantages thereof, will best be understood by reference to the following specification taken in connection with the accompanying drawing in which the single figure is a schematic diagram illustrating a pulse commutating ring counter circuit constructed in accordance with the principles of the present invention.

The pulse commutating ring counter circuit of the present invention contemplates the employment of two series of electron discharge devices interconnected to form a plurality of electronics switching circuits which are operative in response to driving pulses of a predetermined polarity to provide output pulses which are a submultiple of the driving pulses and are successively commutated to a plurality of output circuits. By way of example, the pulse commutating ring circuit may be utilized in an electronic telephone system of the type disclosed in the application mentioned heretofore to convert driving pulses occurring at a predetermined relatively high repetition rate into positive and negative units or tens pulses and to divert or commutate the negative units or tens pulses thus developed successively to a series of negative units or tens pulse conductors and the positive units or tens pulses successively to a series of positive units or tens pulse conductors.

Referring now more particularly to the drawing, there is illustrated a pulse commutating ring circuit constructed in accordance with the principles of the present invention. In general, the pulse commutating ring circuit comprises an impulse repeating and amplifying tube 10 of the 6J6 type and ten counter stages, or pulse forming and gating stages, of which the first three and tenth stages are illustrated. Each pulse gating and forming stage comprises four tubes, which, for convenience of explanation, have been arranged in vertical alignment. Thus, the first pulse forming and gating stage comprises the vertically aligned tubes 101, 111, 121 and 131, the second stage comprises the four vertically aligned tubes 102, 112, 122, and 132, the third stage comprises the four vertically aligned tubes 103, 113, 123, 133, and the last or tenth stage comprises the four vertically aligned tubes 110, 120, 130, and 140. Considered on the basis of horizontal alignment, the tubes 101, 102, 103, 110, 111, 112, 113, and 120 in the two upper rows are ring circuit tubes, the tubes 121, 122, 123, and 130 in the third row function as amplifier and inverter tubes, and the tubes 131, 132, 133, and 140 function as output tubes. All tubes included in the circuit, with the exception of the input pulse amplifying and repeating tube 10 and the output tubes 131, 132, 133, and 140 are commercial type 6AK6 pentodes. The output tubes 131, 133, and 140 are commercial type 6AS7 triodes.

More specifically considered, the two top tubes of each pulse forming and gating stage are connected in the manner more fully explained below to function as an Eccles-Jordan flip-flop circuit, such that the ten pairs of tubes in the two upper horizontal tube rows effectively comprise a pulse commutating ring counter circuit. The successive response of the ten Eccles-Jordan circuits to successive driving pulses developed on the ring drive conductor 11 result in the production of pulses at successive stages of the ring circuit which are respectively repeated through the coupling condensers 150*a*, 150*b*, 150*c*—150*j*, to the control grids of the amplifier and inverter tubes 121, 122, 123—130. These tubes in amplifying and inverting the pulses successively received on the control grids thereof repeat the same in amplified form through the condensers 151*a*, 151*b*, 151*c*—151*j*, successively to the control grids of the output tubes 131, 132, 133—140. In responding to the pulses successively impressed upon the control grids thereof, the identified output tubes develop negative pulses successively on the negative output pulse conductors 152*a*, 152b, 152*c*—152*j* and simultaneously develop positive pulses successively on the positive output pulse conductors 153*a*, 153*b*, 153*c*—153*j* in the manner generally explained above.

In considering the operation of the pulse commutating ring counter circuit, it is pointed out that positive driving pulses occurring at a constant frequency rate of one megacycle, for example, are applied to the control grids of the repeating device 10 and are positively repeated through the coupling capacitor 12 to the ring drive conductor 11. Specifically, each positive pulse appearing at the input terminal 13 produces a voltage drop across the resistor 14 which drives the parallel connected grids of the tube 10 positive to produce a corresponding increase in the voltage across the cathode load resistor 15 of the tube. Each time a positive pulse is thus produced across the resistor 15, current flows through the condenser 12 and the series connected resistors 16 and 17 to increase the positive potential on the ring drive conductor 11. Thus, the positive input or driving pulses to the pulse commutating ring circuit are amplified through the tube 10 and repeated to the ring drive conductor 11. The input coupling condenser 18 and the output coupling condenser 12 are of such size as to fully discharge during each period separating successive pulses applied to the input terminal 13.

In order to start the pulse commutating ring circuit, the switch 20 is closed to bridge the voltage dropping resistor 21 and the condenser 22 in series across the terminals of the negative 100 volts bias potential source and the positive 150 volts anode current source in series. This operation has the effect of producing heavy current flow through the series connected elements to produce voltage drops thereacross. Initially, the major portion of the available two hundred and fifty volts supplied by the two sources appears across the resistor 21. However, as the condenser 22 charges up, the voltage drop across the resistor 21 is decreased to its normal value. In this connection, it will be understood that the bypass condenser 23, which remains in the circuit and normally bypasses the resistor 21, is of substantially smaller value than the inserted condenser 22, the resistor 21 and condenser 22 having a relatively long time constant to bring the bias voltage gradually back to its original value as the condenser 22 charges up. The transient voltage which is thus developed across the resistor 21 has the effect of shock exciting one stage of the ring circuit into operation. After operation of the ring circuit is initiated, he switch 20 may be opened and the circuit will continue to operate in the manner described below. It has been found that the described method of starting the ring circuit positively precludes the possibility of two or more stages of the circuit starting to operate simultaneously. Hence the described starting arrangement constitutes an important novel feature of the pulse commutating ring counter circuit of the present invention.

With the pulse commutating ring circuit in operation, only one of the tubes 101, 102, 103—110 in the upper horizontal string is off, i. e., nonconducting, and only a corresponding one of the tubes 111, 112, 113—120 in the second horizontal string is on, i. e., conducting at any given instant. Assume now that in the upper horizontal tube string, the tube 101 is not conducting with all other tubes of this string conducting and that in the second horizonal string the tube 111 is conducting with all other tubes of this string not conducting. With the circuit in this condition, anode current is delivered to the nine on string tubes 102, 103—110 through the resistors 155*b*, 155*c*—155*j* and the inductance elements 156*b*, 156*c*—156*j* and the common voltage dropping resistor 157 from the anode current source which has a terminal voltage of one hnudred and fifty volts. These impedance elements are so proportioned that the voltage drop across the resistor 157 is approximately 75 volts, which means that the anode potential on the non-conducting tube 101 is 75 volts and the anode potentials of the other tubes of the on-string are appreciably less than 75 volts. The control grid of the off-string tube 111 is connected directly to the anode of the on-string tube 101, such that when the tube 101 is not conducting the control grid of the tube 111 has a positive potential of 75 volts reverse impressed thereon relative to ground. However, with the off-string tube 111 conducting, the current traversing this tube and the resistors 16 and 17 causes a voltage drop to be produced across the two identified series connected resistors which has a magnitude of approximately 75 volts. Thus the cathode of the tube 111 is operating at a postive potential which is substantially the same as the control grid potential of this tube. The bias voltage on the control grid of the tube 101 is obviously a function of the voltage drop across the resistor 159a which, in turn, is a function of the magnitude of current flow through the tube 111 and the series connected resistors 160a and 162a. More specifically, with the tube 111 conducting, the voltage drop across the resistor 159a is relatively low, i. e., of the order of 80 volts, such that the control grid of the tube 101 is negatively biased to a potential of approximately 20 volts with respect to the tube cathode and the tube is thus biased beyond cutoff.

With the circuit in the condition just described, the next positive drive pulse produced on the drive pulse conductor 11 in the manner explained above has the effect of increasing the cathode potential of the tube 111 positively by an amount sufficient to cut off space current flow through this tube. In response to this operation, current flow through the resistor 159a is increased to decrease the bias on the control grid of the tube 101 sufficient to render the latter tube conductive. As the tube 101 starts to conduct, its anode becomes less positive due to the voltage drop across the inductance element 156a and the resistor 155a, with the result that a negative pulse is transmitted through the condenser 158a to the control grid of the next on-string tube 102. This pulse is of sufficient amplitude to drive the control grid of the tube 102 beyond cutoff. As a consequence, the tube 102 stops conducting and the anode potential thereof rises to increase the positive potential on the control grid of the companion off-string tube 112. So long as the positive drive pulse persists on the conductor 11 to hold the cathode potential of the tube 112 at a high positive level, the tube cannot conduct even though the control grid potential is positively increased in the manner just described. However, when the drive pulse on the conductor 11 ends, the cathode potential of the tube 112 drops sufficiently to render this tube conductive under the influence of the increased positive potential impressed on the control grid of the tube from the anode of the tube 102. As soon as the tube 112 starts to conduct, the voltage drop across the resistor 159b is decreased to a value such that the tube 102 remains biased beyond cutoff from the negative one hundred volts bias potential source. Thus, the tube 102 is held non-conductive after the pulse transmitted to the control grid thereof through the condenser 158a ends. In this connection, it is pointed out that the condenser 158a is chosen to have a capacitance value such that the negative pulse impressed upon the control grid of the tube 102 cannot die out to render this tube conductive before the driving pulse on the conductor 11 ends. This condenser is also made small enough so that it is fully discharged before it is again called upon to deliver a negative pulse to the control grid of the tube 102.

When the tube 101 is rendered conductive to reduce the anode potential thereof in the manner just explained, the potential on the control grid of the tube 111 is reduced to a value such that when the drive pulse on the conductor 11 ends, the tube 111 is still biased beyond cutoff. Thus, current conduction through the tube 101 has the effect of preventing current flow through the tube 111 after the pulse on the drive conductor 11 is terminated.

In a manner entirely similar to that just described, the next succeeding pulse developed on the drive conductor 11 has the effect of arresting current conduction through the tube 112, starting current conduction through the tube 102, arresting current conduction through the tube 103 and starting current conduction through the tube 113. The manner in which additional pulses appearing on the drive conductor 11 successively activate the fourth to tenth stages of the ring circuit will be entirely apparent from the preceding explanation. In this regard, it is noted that when the tenth pulse is delivered to the ring circuit from the drive conductor to cut off space current conduction through the tube 120 and render the tube 110 conductive, a negative pulse is transmitted through the condenser 158j to cut off space current flow through the tube 101, with the result that this tube is rendered non-conductive and the tube 111 is rendered conductive when the tenth drive pulse on the drive conductor 11 ends.

From the above explanation, it will be apparent that as successive drive pulses appear on the drive conductor 11, the ten stages of the ring circuit comprising the two upper horizontal tube strings are sequentially activated. In order to prevent more than one stage of the ring circuit from responding to any given drive pulse, the resistors 16 and 17 are so proportioned that if two of the off-string tubes 111, 112—120 start to conduct simultaneously a voltage drop is produced across these resistors which has the effect of biasing both of the conducting tubes beyond cutoff. As a practical matter, this is accomplished by adjusting the short-circuiting wiper 17a along the resistor 17 to a point where current flow through any one of the tubes 111, 112—120 and the resistors 16 and 17 has the effect of biasing these tubes fairly close to the cutoff point. It will be understood that with the circuit adjusted in this manner, positive drive pulses of relatively low amplitude appearing on the drive conductor 11 will have the effect of switching the ring circuit in the manner explained above.

Another important feature of the pulse commutating ring counter circuit of the present invention is the use of coupling condensers 158a, 158b, 158c—158j connected between the anodes and control grids of successive tubes 101, 102, 103—110 of the on-string rather than between successive tubes 111, 112, 113—120 of the off-string. This arrangement is of importance for the reason that since the tubes of the off-string are normally biased considerably beyond cutoff, a relatively large change in the potentials on the control grids thereof would be required to effect the described stage switching operations in response to delivery of successive drive pulses to the pulse commutating ring circuit. On the other hand, the control grids of the on-string tubes 101, 102, 103—110 are normally biased to saturation through the resistors 159a, 159b, 159c—159j. As a consequence, delivery of a small negative pulse to the control grid of any on-string tube, as to the control grid of the tube 102 through the condenser 158a, for example, has the effect of cutting off space current flow through the tube.

In considering the manner in which the step-by-step operation of the pulse commutating ring circuit results in the production of positive and negative output pulses successively on the negative output pulse conductors 152 and the positive output pulse conductors 153, it is first pointed out that normally the amplifier and inverter tubes 121, 122, 123—130 are conducting heavily.

Thus, the control grids of these tubes are respectively connected through the grid current limiting resistors 164a, 164b, 164c—164j directly to the positive terminal of the anode current source, so that heavy grid and anode currents flow in these tubes. On the other hand, the tubes 131, 132, 133—140, constituting the output string, are normally biased beyond cutoff by the charges accumulated on the respective associated condensers 151a, 151b, 151c—151j.

With the pulse commutating ring circuit operating in the manner described above, negative pulses are developed on the negative output pulse conductors 152a, 152b, 152c—152j and positive output pulses are developed on the positive pulse conductors 153a, 153b, 153c—153j only when the respective corresponding tubes 111, 112, 113—120 are conducting. Thus, a negative pulse is developed on the negative output pulse lead 152a and a positive pulse is developed on the positive pulse lead 153a when the tube 111 is rendered conductive under the influence of a driving pulse on the conductor 11. More specifically, when the tube 111 is rendered conductive to produce space current flow therethrough, the positive potential of its anode is decreased to transmit a negative pulse through the coupling condenser 150a to the control grid of the tube 121. This pulse, during its persistence interval, has the effect of decreasing space current flow through the tube 121 to produce a corresponding increase in the positive anode potential of the tube. As a result, the pulse is inverted to a positive pulse and repeated in amplified form through the condenser 151a to the control grid of the output tube 131. This repeated positive pulse is of very large amplitude and has the effect of driving the control grid of the tube 131 sufficiently positive to saturate space current flow through the tube. Thus, the tube 131, which as explained above is normally cut off, is abruptly rendered conductive at its saturation level. During the conducting interval of the tube 131, the condenser 151a is heavily charged by grid current flow through this tube, such current flow occurring over a path which extends from positive terminal of the anode current source by way of the resistor 165a, the inductance element 166a, the condenser 151a, the grid-cathode path in the tube 131, and the resistor 171a to the grounded negative terminal of the anode current source. As a result of the heavy anode current flow thus produced through the tube 131, the voltage drop across the cathode resistor 171a is sharply increased to produce the desired positive pulse on the positive output pulse conductor 153a. Concurrently therewith, the voltage drop across the anode load resistor 170a is sharply increased to correspondingly decrease the potential on the negative output pulse conductor 152a and thus develop the desired negative pulse on this conductor.

The duration of the pulses thus developed on the output pulse conductors 152 and 153 is measured by the spacing interval between two successive drive pulses appearing on the ring drive conductor 11. Thus when the next succeeding drive pulse is developed on this conductor to render the tube 111 non-conductive in the manner explained above, the positive anode potential of this tube is sharply increased to produce a corresponding sharp increase in current flow through the tube 121. As a result, the positive anode potential of the tube 121 is sharply decreased. More specifically, the voltage at the anode of the tube 121 is less than the voltage across the condenser 151a, which is now negatively applied to the control grid of the tube 131, by an amount sufficient to cut off space current flow through the latter tube. As a consequence, the voltage drops across the resistors 171a and 170a are sharply decreased to their reference value levels to terminate the pulses on the conductors 153a and 152a.

In a manner entirely similar to that just described, negative and positive output pulses are respectively produced on the conductors 152b and 153b in the next succeeding time position during successive intervals of conduction of the tube 112. Similarly, positive and negative pulses are respectively produced on the conductors 153c and 152c in the next succeeding time position during those intervals when the tube 113 is conducting. Thus it will be understood that negative output pulses are successively produced on the conductors 152a, 152b, 152c—152j and positive output pulses are concurrently produced on the conductors 153a, 153b, 153c—153j in the manner described during sustained operation of the pulse commutating ring circuit.

As will be apparent from the preceding explanation, the output pulses produced by each of the tubes 131, 132, 133—140 are developed by switching each tube from a completely non-conductive state to a condition where anode current flow through the tube is at the saturation level. This insures the production of output pulses of uniform amplitude having clean tops. As will also be apparent from the preceding explanation, each of the coupling condensers 150a, 150b, 150c—150j is only required to hold the control grid potential of the associated one of the tubes 121, 122, 123—130 at the pulse producing level for an interval equal to the period separating two successive pulses on the drive conductor 11. Accordingly, these condensers may be relatively small. During the interval separating pulse transmission by each of these condensers and equal to the sum of nine output pulse periods, each condenser is fully discharged through one of the respective associated resistors 164a, 164b, 164c—164j. On the other hand, each of the condensers 151a, 151b, 151c—151j is required to hold its charge during each spacing interval separating two pulse transmission periods thereof, i. e., during intervals each equal to the sum of nine units pulse periods. Accordingly, these condensers are relatively large. During such spacing intervals these condensers discharge through their respective associated resistors 167a, 167b, 167c—167j. However, these resistors have very high resistance values such that the condenser discharge rate is low. The inductance elements, such as the elements 156a, 161a and 166a respectively provided in the anode circuits of the tubes forming the upper three rows serve the function of preventing width distortion of the pulses. Each of these elements is self-resonant at a frequency of four to five megacycles.

By way of example, and not in any sense as a limitation to the particular values given, a pulse commutating ring counter-circuit constructed in accordance with the present invention, when supplied with one megacycle driving pulses of positive polarity has been found satisfactory successively to commutate to ten individual output circuits, positive and negative output pulses occurring at a frequency of 100 kilocycles, i. e., a counting rate of ten to one, and having a duration approximately equal to the spacing between driving pulses, i. e., one microsecond.

In the specific embodiment other circuit constants employed are as follows:

| | |
|---|---|
| Resistor 14 | 1 megohm |
| Resistor 15 | 4700 ohms |
| Resistor 16 | 3300 ohms |
| Resistor 17 | 1000 ohms |
| Resistor 21 | 1000 ohms |
| Resistor 155a | 3900 ohms |
| Resistor 157 | 750 ohms |
| Resistor 159a | 33,000 ohms |
| Resistor 160a | 3900 ohms |
| Resistor 162a | 56,000 ohms |
| Resistor 164a | 150,000 ohms |
| Resistor 165a | 3900 ohms |
| Resistor 167a | 1 megohm |
| Capacitor 12 | 1000 mmf. |
| Capacitor 18 | 1000 mmf. |
| Capacitor 22 | 30 mfd. |
| Capacitor 23 | .1 mfd. |
| Capacitor 150a | 100 mmf. |
| Capacitor 151a | 500 mmf. |
| Capacitor 158a | 5 mmf. |
| Capacitor 163a | 10 mmf. |

Inductances 156a, 161, and 166a—125 turns No. 30 SSE 500 cam on 1/4" by 1 7/8" core It will be understood that the circuit constants of the second through tenth stages of the pulse commutating ring circuit are identical with the values given above.

While there has been described what is at present considered to be the preferred embodiment of the invention, it will be understood that various modifications may be made therein which are within the true spirit and scope of the invention as defined in the appended claims.

What is claimed as new and is desired to be secured by Letters Patent of the United States is:

1. A pulse commutating ring counter circuit, comprising a plurality of electronic switching circuits, means connecting said circuits in an endless series, an impedance common to all of said circuits and included in the space current path of each of said circuits, a source of driving pulses, means connecting said source to said impedance thereby sequentially to actuate said switching circuits in accordance with said driving pulses, and means for deriving an output pulse from each of said switching circuits in accordance with successive actuations thereof.

2. A pulse commutating ring counter circuit, comprising a plurality of electronic switching circuits, means connecting said circuits in an endless series, an impedance common to all of said circuits and included in the space current path of each of said circuits, a source of driving pulses, means connecting said source to said impedance thereby sequentially to actuate said switching circuits in response to successive ones of said driving pulses, means for deriving an output pulse from each of said switching circuits in accordance with successive actuations thereof, and starting means for conditioning said switching circuits for subsequent actuation by said driving pulses.

3. A pulse commutating ring counter circuit, comprising a plurality of electronic switching circuits, means connecting said circuits in an endless series, an impedance common to all of said circuits, a source of driving pulses, means connecting said source to said impedance thereby to actuate said switching circuits in predetermined sequence in accordance with said driving pulses, means for deriving output pulses from each of said switching circuits in accordance with successive actuations thereof, and means for varying the value of said common impedance thereby substantially to prevent multiple actuation of said switching circuits.

4. A pulse commutating ring counter circuit, comprising a plurality of electronic switching circuits, means connecting said circuits in an endless series, an impedance common to all of said circuits and included in the space current path of each of said circuits, a source of driving pulses, means connecting said source to said impedance thereby to actuate said switching circuits in predetermined sequence in accordance with said driving pulses, means for deriving output pulses from each of said switching circuits in accordance with successive actuations thereof, said common impedance having a value large enough substantially to prevent multiple actuation of said switching circuits while permitting actuation of a single one of said circuits in response to said driving pulses.

5. A pulse commutating ring counter circuit, comprising a plurality of electronic switching circuits, means including a plurality of networks for connecting said circuits in an endless series, an impedance common to all of said circuits, a source of driving pulses, means connecting said source to said impedance thereby sequentially to actuate said switching circuits in response to said driving pulses, and means for deriving an output pulse from each of said switching circuits in accordance with successive actuations thereof, each of said plurality of networks having a time constant long as compared to the duration of said driving pulses and short as compared to the period between successive actuations of any one of said circuits.

6. A pulse commutating ring counter circuit, comprising a plurality of electronic switching circuits, means connecting said circuits in an endless series, an impedance common to all of said circuits, a source of driving pulses, means connecting said source to said impedance thereby to actuate said switching circuits in predetermined sequence in response to said driving pulses, a phase inverting stage for each of said circuits, means for including a first network having a time constant short as compared to the period between successive actuations of a given circuit for coupling each of said circuits to the associated phase inverter stage, an output stage for each of said phase inverter stages, and means including a second network having a time constant long as compared to said actuation interval for coupling each of said phase inverter stages to the associated output stage, and means for deriving positive and negative output pulses from each of said output stages.

7. A pulse commutating ring counter circuit, comprising first and second equal numbered series of electron discharge devices, a source of driving pulses, means connecting the anode of each device in said first series to the control electrode of the next succeeding device in said first series, means for connecting the anode of each device in said first series to the control electrode of the corresponding device in said second series, means connecting the control electrode of each device in said first series to the anode of the corresponding device in said second series and to a source of negative potential, means connecting the cathode of each of said devices in said second series to a common impedance, means connecting said source of driving pulses to said common impedance, and means for deriving a commutated output pulse from each device in said second series.

8. A pulse commutating ring counter circuit comprising a first series of electron discharge devices, a source of driving pulses, a second series of electron discharge devices equal in number to the devices in said first series, means including resistance means for connecting the anode of each device in said first series to the control electrode of the corresponding device in said second series, means directly connecting the anode of each device in said second series to the control electrode of the corresponding device in said first series, means connecting the control electrode of each device in said first series to a negative source of potential, means connecting the cathodes of all the devices in said first series to a common impedance, means connecting the anode of each device in said second series to the control electrode of the next succeeding device in said second series, means for deriving a commutating output pulse from each tube in said first series, and means for starting said first and second series of tubes in a predetermined sequence.

9. A pulse commutating ring counter circuit comprising a first series of electron discharge devices, a source of driving pulses, a second series of electron discharge devices equal in number to the devices in said first series, means including resistance means for connecting the anode of each device in said first series to the control electrode of the corresponding device in said second series, means directly connecting the anode of each device in said second series to the control electrode of the corresponding device in said first series, means connecting the control electrode of each device in said first series to a negative source of potential, means connecting the cathodes of all the devices in said first series to a common impedance, means connecting the anode of each device in said second series to the control electrode of the next succeeding device in said second series, means for deriving a commutated output pulse from each device in said first series, and means for starting said series of devices in a predetermined sequence, said last named means including means for reducing the value of said source of negative potential.

10. A pulse commutating system, comprising a source of driving pulses and a series of electronic switching stages, each of said stages comprising first and second electron discharge devices, means directly connecting the anode of said first device to the control electrode of said second device, means including a resistor for connecting the anode of said second device to the control electrode of said first device, means connecting the control electrode of said first device to a negative source of potential, means connecting the cathode of said second device to said source of driving pulses, means for deriving an output pulse from the anode of said second device, and means connecting the anode of said first device to the control electrode of the first device of the next succeeding switching stage thereby to cause said driving pulses successively to actuate said series of switching stages.

11. A pulse commutating system, comprising a series of counter stages, each of said stages comprising an electronic switching circuit a phase inverter stage and an output stage, means including a first network for connecting said switching circuit to said phase inverter stage, means including a second network for connecting said phase inverter stage to said output stage, an impedance common to all said switching circuits, means for supplying driving pulses to said common impedance, and means for connecting the switching circuits of said stages in an endless series thereby to cause said driving pulses successively to actuate said series connected switching circuits, said first networks having time constants short as compared with the period between successive actuations of a given switching circuit, and said second networks having time constants long as compared to said actuation interval.

12. A pulse commutating system, comprising a source of driving pulses and a series of electronic switching stages, each of said stages comprising first and second electron discharge devices, means directly connecting the anode of said first device to the control electrode of said second device, means including a resistor for connecting the anode of said second device to the control electrode of said first device, means connecting the control electrode of said first device to a negative source of potential, means connecting the cathode of said second device to said source of driving pulses, means for deriving an output pulse from the anode of said second device, and means connecting the anode of said first device to the control electrode of the first device of the next succeeding switching stage, and means for starting said pulse commutating system, said last named means including means for decreasing the potential of said negative potential source.

13. A pulse commutating ring counter circuit, comprising a plurality of electronic switching tubes, means connecting said tubes in an endless series, an impedance common to all of said tubes and included in the space current path of each of said tubes, a source of driving pulses, means connecting said source to said impedance, thereby sequentially to render conductive said switching tubes at the rate of one tube for each driving pulse, and means for deriving output pulses from said switching tubes as said tubes are sequentially rendered conductive.

14. A pulse commutating ring counter circuit, comprising a plurality of electronic switching tubes, means connecting said tubes in an endless series, an impedance common to all of said tubes and included in the space current path of each of said tubes, a source of driving pulses, means connecting said source to said impedance, thereby sequentially to render conductive said switching tubes at the rate of one tube for each driving pulse, and means for deriving an output pulse from each of said switching tubes as said tubes are sequentially rendered conductive, said common impedance having a value large enough substantially to prevent multiple conduction of said switching tubes while permitting conduction of a single one of said tubes in response to each driving pulse.

15. A pulse commutating ring counter circuit, comprising a plurality of electronic switching tubes, means connecting said tubes in an endless series, an impedance common to all of said tubes and included in the space current path of each of said tubes, a source of driving pulses of positive polarity, means connecting said source to said impedance, means responsive to pulses produced across said impedance by said source for rendering all of said tubes non-conductive for the duration of each driving pulse, means responsive to cessation of each of said driving pulses for sequentially rendering said tubes conductive at the rate of one tube for each driving pulse, and means for deriving an output pulse from each of said switching tubes during each period when the tube is rendered conductive.

16. A pulse commutating ring counter circuit, comprising a plurality of electronic switching tubes, means connecting said tubes in an endless series, an impedance common to all of said tubes and connected to the cathode of each of said tubes, a source of driving pulses of positive polarity, means connecting said source to said impedance, means responsive to pulses produced across said impedance by said source for rendering all of said tubes non-conductive for the duration of each driving pulse, means responsive to cessation of each of said driving pulses for sequentially rendering said tubes conductive at the rate of one tube for each driving pulse, and means for deriving an output pulse from each of said switching tubes during each period when the tube is rendered conductive.

ROBERT B. TROUSDALE.

REFERENCES CITED

The following references are of record in the file of this patent:

UNITED STATES PATENTS

| Number | Name | Date |
|---|---|---|
| 2,272,070 | Reeves | Feb. 3, 1942 |
| 2,306,386 | Hollywood | Dec. 29, 1942 |
| 2,402,432 | Mumma | June 18, 1946 |
| 2,426,454 | Johnson | Aug. 26, 1947 |
| 2,443,198 | Sallach | June 15, 1948 |